(12) United States Patent
Mak-Fan et al.

(10) Patent No.: US 8,384,677 B2
(45) Date of Patent: Feb. 26, 2013

(54) ELECTRONIC DEVICE INCLUDING TOUCH-SENSITIVE INPUT SURFACE AND METHOD OF DETERMINING USER-SELECTED INPUT

(75) Inventors: David Mak-Fan, Waterloo (CA); Kuo-Feng Tong, Etobicoke (CA); Matthew Bells, Waterloo (CA); Douglas Rider, Ottawa (CA); Michael Langlois, Almonte (CA); Jong-Suk Lee, Thornhill (CA); Jason T. Griffin, Kitchener (CA); Colin Ho, Kanata (CA)

(73) Assignee: Research In Motion Limited, Waterloo (CA)

( * ) Notice: Subject to any disclaimer, the term of this patent is extended or adjusted under 35 U.S.C. 154(b) by 1219 days.

(21) Appl. No.: 12/109,863

(22) Filed: Apr. 25, 2008

(65) Prior Publication Data

US 2009/0267904 A1 Oct. 29, 2009

(51) Int. Cl.
  *G06F 3/041* (2006.01)
(52) U.S. Cl. .................................. 345/173; 345/179
(58) Field of Classification Search ........... 345/173–179
  See application file for complete search history.

(56) References Cited

U.S. PATENT DOCUMENTS

| | | | | |
|---|---|---|---|---|
| 5,543,591 A | * | 8/1996 | Gillespie et al. | ........... 178/18.03 |
| 5,602,570 A | * | 2/1997 | Capps et al. | .................. 345/173 |
| 6,118,435 A | | 9/2000 | Fujita et al. | |

FOREIGN PATENT DOCUMENTS

| | | |
|---|---|---|
| GB | 2402105 | 12/2004 |
| WO | 9611435 | 4/1996 |

OTHER PUBLICATIONS

Search and Examination Report, European Patent Application No. 08155242.4 dated Sep. 15, 2008.

* cited by examiner

*Primary Examiner* — Kevin M Nguyen
*Assistant Examiner* — Cory Almeida
(74) *Attorney, Agent, or Firm* — Geoffrey deKleine; Borden Ladner Gervais LLP (57) ABSTRACT

A method of determining input at a touch-sensitive input surface of a portable electronic device includes detecting a touch event at the touch-sensitive input surface, sampling touch attributes during the touch event, determining an actual touch location and determining at least one shift in touch location based on the touch attributes sampled during the touch event, and determining an input based on the actual touch location and the direction of shift of the touch location.

22 Claims, 6 Drawing Sheets

ELECTRONIC DEVICE INCLUDING TOUCH-SENSITIVE INPUT SURFACE AND METHOD OF DETERMINING USER-SELECTED INPUT

FIELD OF TECHNOLOGY

The present application relates to electronic devices with touch-sensitive input surfaces and to the determination of user-selections at the input surface.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and ease of portability. Smaller devices are generally desirable for portability. Touch screen devices constructed of a display, such as a liquid crystal display, with a touch-sensitive overlay are useful on such handheld devices as such handheld devices are small and are therefore limited in space available for user input and output devices. Further, the screen content on the touch screen devices can be modified depending on the functions and operations being performed.

These touch-screen devices suffer from disadvantages, however, as the resolution of such touch-screen devices is limited due to the inaccuracy of touch contact by the user. The intended touch contact location is often not at the point of actual touch contact made by the user. Thus, when closely-spaced user-selectable options are provided on a graphical user interface, an option targeted by the user may not be accurately touched, resulting in an incorrect option being determined at the device.

Improvements in touch-screen devices are therefore desirable.

BRIEF DESCRIPTION OF THE DRAWINGS

Embodiments of the present application will now be described, by way of example only, with reference to the attached Figures, wherein.

DETAILED DESCRIPTION

Generally, described is a method of determining input at a touch-sensitive input surface of a portable electronic device. The method includes detecting a touch event at the touch-sensitive input surface, sampling touch attributes during the touch event, determining an actual touch location and determining at least one shift in touch location based on the touch attributes sampled during the touch event, and determining an input based on the actual touch location and the direction of shift of the touch location.

The portable electronic device can include a mechanical system such as a mechanical switch for providing auditory and tactile feedback to the user during interaction with the touch-sensitive input surface.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The application generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 1:
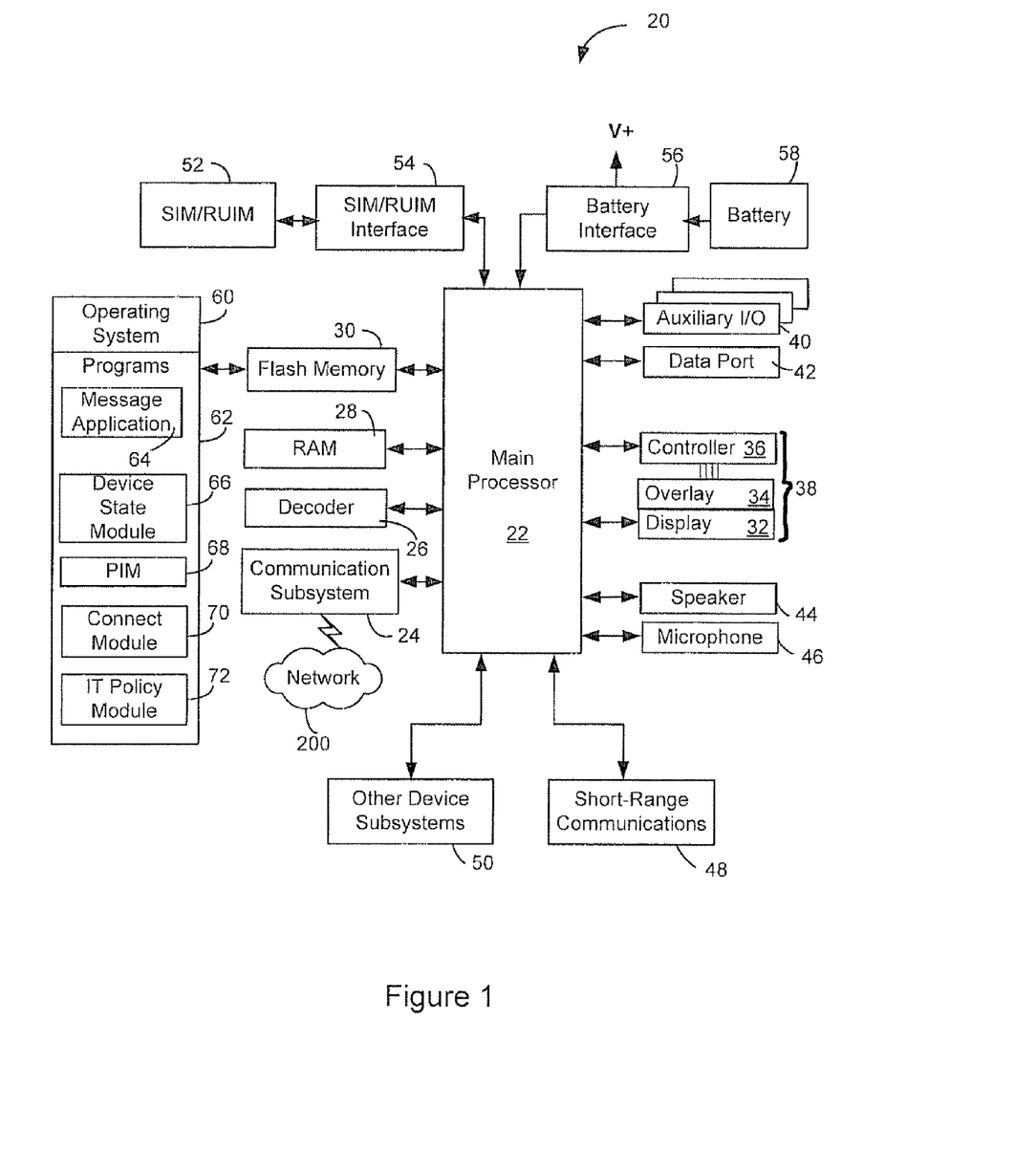
FIG. 1 is a simplified block diagram of components including internal components of a portable electronic device according an aspect of an embodiment.

Reference is first made to FIG. 1, which shows a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24.

Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 200. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 24 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display device 32 with a touch-sensor assembly including a touch-sensitive overlay 34 connected to an electronic controller 36. The display device 32 together with the touch-sensor assembly are part of a touch-screen display 38, at least a portion of which can be moveable with respect to the housing of the portable electronic device 20. Although not shown in the present embodiment, a mechanical switch or switches can be located in the housing for actuation as a result of movement of the touch-screen display 38 to provide additional input. The processor 22 also interacts with an auxiliary input/output (I/O) subsystem 40, a data port 42, a speaker 44, a microphone 46, short-range communications 48 and other device subsystems 50. A touch-sensitive input surface is provided by the touch-sensitive overlay 34 connected to the electronic controller 36 and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display device 32 and the touch-sensor assembly including the touch-sensitive overlay 34 connected to the electronic controller 36 may be used for both communication-related functions, such as entering a text message for transmission over the network 200, and device-resident functions such as calculator or task list functions.

The portable electronic device 20 can send and receive communication signals over the wireless network 200 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 200. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 200 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 to 72 which are described in more detail below. The operating system 60 and the software components 62 to 72 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 200, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 200. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display device 32 or alternatively to the auxiliary I/O subsystem 40. A subscriber may also compose data items, such as e-mail messages, for example, using the touch-screen display 38 and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 200 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display device 32 can also be used to provide additional information such as the identity of a calling party, duration of a voice call, or other voice call related information.

Figure 2:
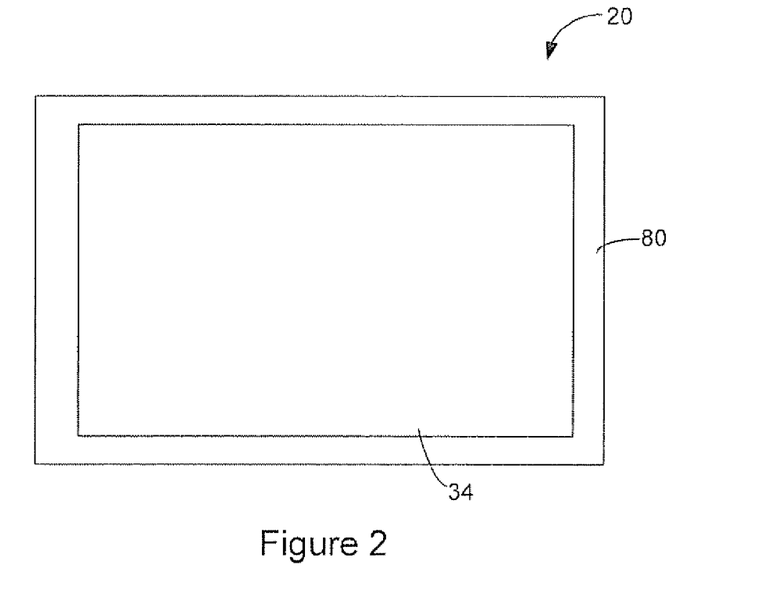
FIG. 2 is a front view of an exemplary portable electronic device in accordance with one embodiment.
Figure 3:
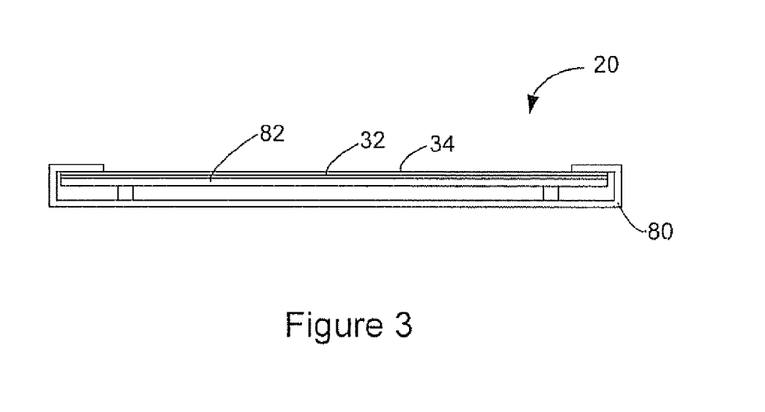
FIG. 3 is a simplified sectional view of the portable electronic device of FIG. 2.

In addition to FIG. 1, reference is now made to FIGS. 2 and 3, which show a front view and a simplified sectional side view, respectively, of an exemplary portable electronic device 20. The portable electronic device includes a housing 80 and the display device 32 that is exposed by the housing 80. The touch-sensitive input device is provided by the touch sensor assembly and includes the touch-sensitive overlay 34 overlying the display device 32. The touch-sensitive overlay 34 and the display 32 are supported by a rigid display support 82 to provide structural support to the touch-screen display 38 and inhibit bending causing damage or breaking of the touch-screen display 38.

Functional components in the housing 80 include a memory device such as the flash memory 30 and a processor 22 operably connected to the display device 32 the touch-sensitive input device, and the memory device for executing a program stored in the memory device to cause the electronic device 20 to detect a touch event at the touch-sensitive input surface, sample touch attributes during the touch event, determine an actual touch location and determine at least one shift in touch location based on the touch attributes sampled during the touch event, and determine an input based on the actual touch location and the direction of shift of the touch location.

The housing 80 houses the internal components, such as those shown in FIG. 1 and frames the touch-screen display 38 such that the touch-screen display 38 is exposed for user-interaction therewith when the portable electronic device 20 is in use. The touch-screen display 38 can provide any suitable user-selectable options such as a virtual keyboard, each option being selectable by touching the touch-screen display 38. The touch-screen display 38 can be any suitable touch-screen display. Thus, the touch-sensitive overlay 34 can be any one or combination of, for example, a capacitive touch-sensitive overlay, a resistive touch-sensitive overlay, an optical touch-sensitive overlay, or any other suitable touch-sensitive overlay. Such touch-sensitive overlays can include a plurality of layers in a stack and can be fixed to the display device 32 by a suitable optically clear adhesive.

The touch attributes including the X and Y location of a touch event on the touch-screen display 38 are both determined from signals generated from the touch-sensitive overlay 34, received at electronic controller 36. It will be appreciated that other touch attributes of the touch event on the touch-screen display 38 can also be determined.

In the example of a capacitive touch-sensitive overlay, the X and Y location of a touch event can both be determined with the X location determined by a signal generated as a result of capacitive coupling of a finger with a touch sensor layer and the Y location determined as a result of capacitive coupling of the finger with another touch sensor layer. The resulting signals represent the respective X and Y touch location values. Other touch attributes of the touch event on the touch-screen display 38 can also be determined. For example, the size of the touch on the touch-screen display 38 can be determined in addition to the X and Y location values based on the signals received at the controller 36 from the touch-sensitive overlay 34.

In another example, the X and Y location of a touch event can both be determined as a result of contact between two layers of a resistive touch-sensitive overlay. Similarly, other touch attributes of the touch event on the touch-screen display 38 can also be determined. For example, a relative pressure can be determined based on the area of contact between the two layers of the resistive touch-sensitive overlay.

Referring still to FIGS. 2 and 3, it will be appreciated that a user's touch on the touch-screen display 38 is determined by determining the target X and Y touch location and user-selected input is determined based on the target X and Y touch location and the application executed by the processor 22. For example, an application can provide a virtual keyboard and the button of the virtual keyboard selected by the user is determined according to the method of determining input at the touch-sensitive input surface of the present application. In the example of the virtual keyboard, the user can enter text by touching locations on the virtual keyboard displayed on the touch-screen display 38.

Figure 4:
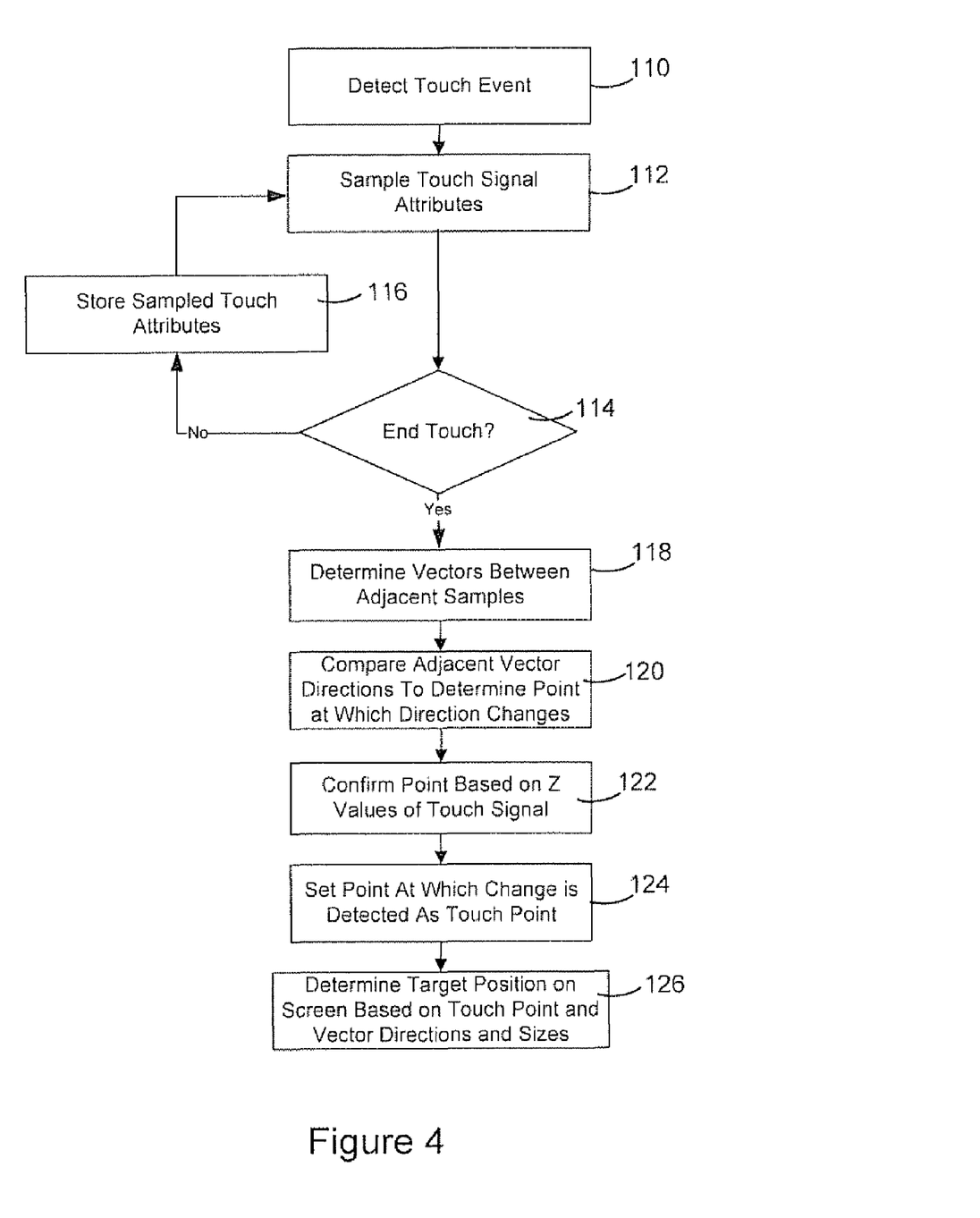
FIG. 4 is a flow chart illustrating steps in a method of determining input at a touch-sensitive input surface of a portable electronic device, according to an embodiment.

Reference is now made to FIG. 4 to describe the method of determining input at the touch-sensitive input surface of a portable electronic according to one embodiment. It will be appreciated that the steps of FIG. 4 can be carried out by routines or subroutines of software executed by the processor 22. Coding of software for carrying out such steps is well within the scope of a person of ordinary skill in the art having regard to the present description.

Signals are received at the controller 36 as a result of the beginning of a touch event in which a user's finger contacts the touch-sensitive overlay 34 of the touch-screen display 38 (step 110). The signals are analyzed at the controller 36 and resultant data transmitted to the processor 22. Thus, the X and Y location values when the touch event begins can be determined along with other attributes such as the size or the pressure of the touch at the touch-screen display 38. It will be appreciated that the touch event is not instantaneous as a typical touch event can last fractions of a second. A touch event can last, for example, about ½ of a second from the instant the touch event is determined to begin to the instant the touch event is determined to end. In response to determination of the beginning of the touch event at step 110, the touch signal is sampled by the controller 36 at a suitable regular interval and analyzed with the resultant data transmitted to the processor 22. Thus, the touch attributes for each sample are received at the processor 22 (step 112). For example, the touch signal attributes can be sampled at a frequency of 80 Hz during the touch event. In this example, touch attributes during the touch event are received at the processor 22 at a frequency of 80 Hz.

The signal to the controller 22 changes, for example, when the user's finger shifts in any direction or when the user lifts the finger from the touch-sensitive overlay 34, therefore ending the touch event. For example, the signal ends when the touch event ends by the user lifting their finger from the touch-sensitive overlay 34. It is determined if the touch event has ended based on the signal (or lack of signal) received at the controller 36 (step 114). If the touch event has not ended, the process proceeds to step 116 and the touch attributes for the sample are stored in the memory at the portable electronic device 20. For example, the touch attributes can be stored in the RAM 28 (step 116). After storing the touch attributes, the process returns to step 112 and another sample is taken in the regular interval as described.

If, on the other hand, the touch event is determined to have ended by a lack of signal received at the controller (the user's finger has lifted from the overlay 34 of the touch-screen display 38), the process proceeds to step 118. The processor 22 analyzes the samples and determines vectors between stored samples, taken adjacent in time, to determine the direction and magnitude of shift in the location of the touch at the touch-screen display 38 (step 118). The vectors determined at step 118 can be a single vector representing the shift in both the X and Y directions between adjacent samples or can be separate vectors, one representing the shift in the X direction and a second representing the shift in the Y direction between adjacent samples.

The vectors are then analyzed to determine the point at which the direction of shift changes (step 120). Thus, a shift generally observed in one direction in successive samples that then changes to the generally opposing direction (reverses) in further successive samples is analyzed to determine the point at which the change in direction occurs.

As indicated, other attributes such as the size or the pressure of the touch at the touch-screen display 38 are also determined from the signals received at the controller 36. Referring to the attribute of area of the touch or pressure of the touch as a Z value of the signals, the Z value is used to confirm the point at which the direction changes. In addition to the shift in at least one of the X and Y directions, the Z value can also shift with Z being the greatest at the point of shift between the X and Y directions. Thus, the Z value at the point at which the X and Y directions are determined to change at step 120 is compared to other Z values to confirm the point of change (step 122). Thus, the X and Y values of the sample at which the change in direction is determined are then set as the detected touch point (step 124). The target position on the touch-screen or targeted input is then determined based on the detected touch point from step 124 and based on the X and Y vector directions determined (or shift directions) and based on the size of the X and Y vectors (or the magnitude of the shift in the X and Y directions) (step 126). Since a user normally touches the touch-screen display 38 at a point that falls short of the intended target, the direction of shift when pressing and the reverse shift when lifting the finger give information that permits the determination of the general direction of approach to the intended target. Thus, an approximation of the target position can be calculated based on the X and Y shift directions. From this approximation and based on the application, the input is determined.

It will be appreciated that rather than the touch event being determined to have ended at step 114 based on the user removing his or her finger from the touch-sensitive overlay 34, the touch event can alternatively be determined to have ended based on the attribute of the area of the touch or the pressure of the touch, referred to herein as the Z value determined from the signal to the controller 22. Thus, the end of the touch event is defined by the Z value rather than the user removing his or her finger from the overlay. Similarly, the touch event can be detected at step 110 based on the Z value determined from the signal. Therefore, in this alternative, the boundaries including the beginning and the end of the touch event are determined based on the Z value rather than contact with the touch-sensitive overlay 34.

Figure 5:
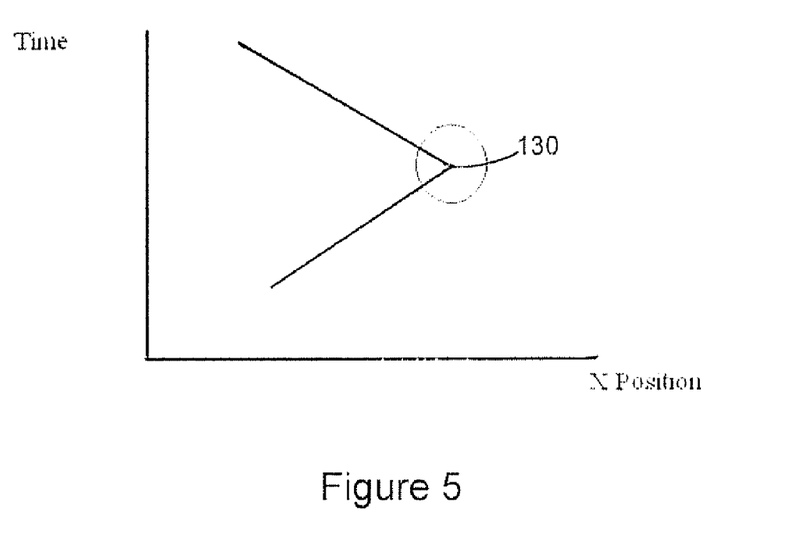
FIG. 5 shows a hypothetical graph of time versus position along an x-axis of the touch-screen of the portable electronic device according to an example.

FIG. 5 shows a hypothetical or ideal graph of the time versus position along an X-axis of the touch-screen display 38 of the portable electronic device 20. For the purpose of simplicity of the present example, only the X-axis is shown. As shown, a shift occurs from left to right along the X-axis and then a return shift from right to left. In the present example, the device can be held with the touch-screen display 38 facing the user and the X-axis represents the axis from left to right on the display 38 with the display facing the user in the upright position. The touch event begins and the X location of the touch shifts from left to right. When the user begins to remove the finger, the shift in the X location changes to the reverse direction, shifting from right to left. In the present example, the left thumb of the user is used to touch the touch-screen display 38 while the user holds the device with both hands. The left thumb approaches the target position from the left and thus the touch shifts from left to right during application of pressure and the shift changes from right to left during release of pressure, as shown in the graph of FIG. 5. The point at which the change occurs is labeled with the reference number 130.

Figure 6:
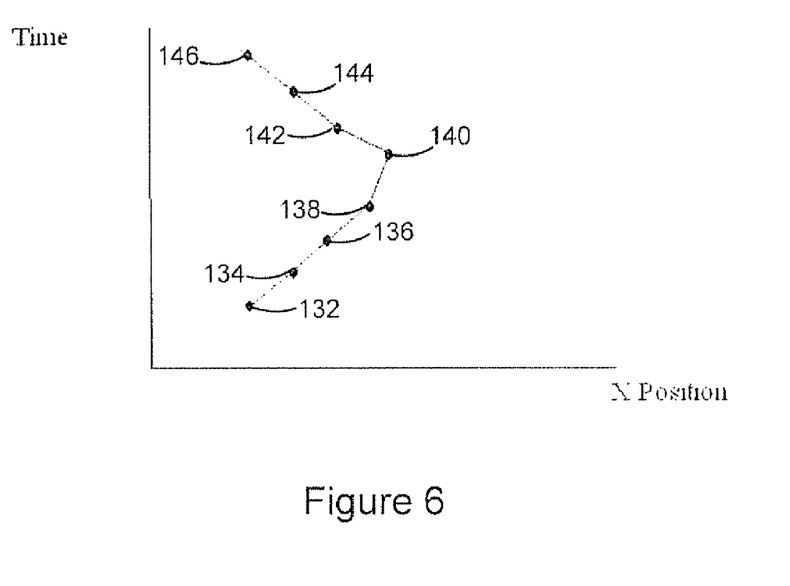
FIG. 6 shows an exemplary graph of time versus position along an x-axis of the touch-screen of the portable electronic device with a total of eight samples measured.

FIG. 6 shows an exemplary graph of time versus position along an X-axis of the touch-screen of the portable electronic device. For the purpose of simplicity, only the X-axis is shown and only eight samples are displayed. Signals are received at the controller 36 as a result of the beginning of the touch event in which the user's left thumb contacts the touch-sensitive overlay 34 of the touch-screen display 38 (step 110). The signals are analyzed at the controller 36 and resultant data transmitted to the processor 22. Thus, the X and Y location values when the touch event begins are determined along with the size of the contact area of the touch at the touch-screen display 38. As indicated, the touch event lasts fractions of a second from beginning of the touch until the end of the touch. The signal is analyzed and the resultant data sent to the processor 22. Thus, the touch attributes at the initiation of the touch event are received at the processor (step 112). It is determined if the touch event has ended based on the signal (or lack of signal) received at the controller 36 (step 114). If the touch event has not ended, the process proceeds to step 116 and the touch attributes for the sample are stored in the memory at the portable electronic device 20. After storing the touch attributes, the process returns to step 112 and another sample is taken in the regular interval as described. In the present example, a total of 8 samples are taken and stored before the touch event ends, identified in the graph of FIG. 6 with the reference numerals 132, 134, 136, 138, 140, 142, 144, 146.

When it is determined that the user's finger has lifted from the touch-screen display 38, the process proceeds to step 118. The processor 22 analyzes the samples and determines vectors between stored samples, taken adjacent in time, to determine the direction and magnitude of shift in the location of the touch at the touch-screen display 38 (step 118). For the purpose of the present example, the vectors determined at step 118 include separate vectors with one representing the shift in the X direction and a second representing the shift in the Y direction between adjacent samples. The vectors are analyzed to determine the point at which the direction of shift changes (step 120). Thus, a shift observed in one general direction in successive samples that then changes to the generally opposite direction (reverses) in further successive samples is analyzed to determine the point at which the change in direction occurs. The point at which the change occurs is determined to be the point 140.

As indicated, the contact area of the touch is also determined from the signals received at the controller 36. This attribute is then used to confirm the direction change at the point 140 (step 122). Thus, the X and Y values of the sample at the point 140 is then set as the detected touch point (step 124). The target position on the touch-screen or targeted input is then determined based on the detected touch point from step 124 and based on the X and Y vector directions determined (or shift directions) and based on the size of the X and Y vectors (or the magnitude of the shift in the X and Y directions) (step 126). In the present example, the approximation of the X co-ordinate of the target position is determined to be to the right of the point 140.

It will now be appreciated that a touch occurrence using the right thumb from the right of the touch-screen display 38 in the left direction results in a graph of time versus position along the X-axis of the touch-screen of the portable electronic device that is generally the opposite or mirror image of that shown in FIG. 6 as the shift direction is from right to left during application of pressure and changes to left to right during release of pressure. It will also be appreciated that a shift can also be observed in the Y direction depending on the direction of approach of the thumb or finger toward the target position of the touch-screen display 38.

Figure 7:
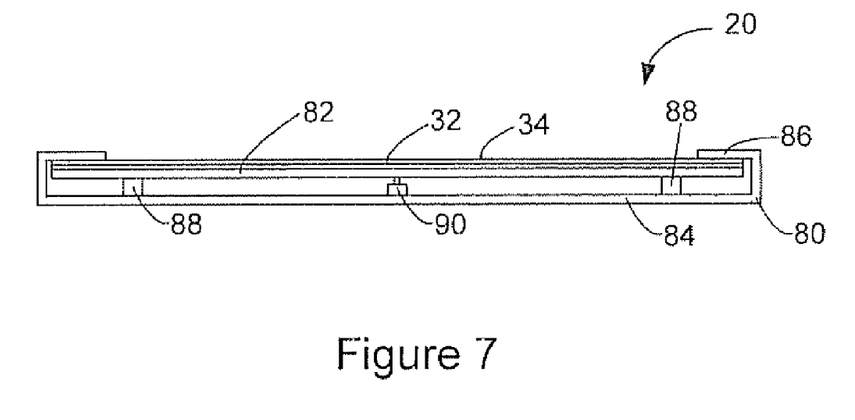
FIG. 7 is a simplified sectional view of an exemplary portable electronic device in accordance with another embodiment.
Figure 8:
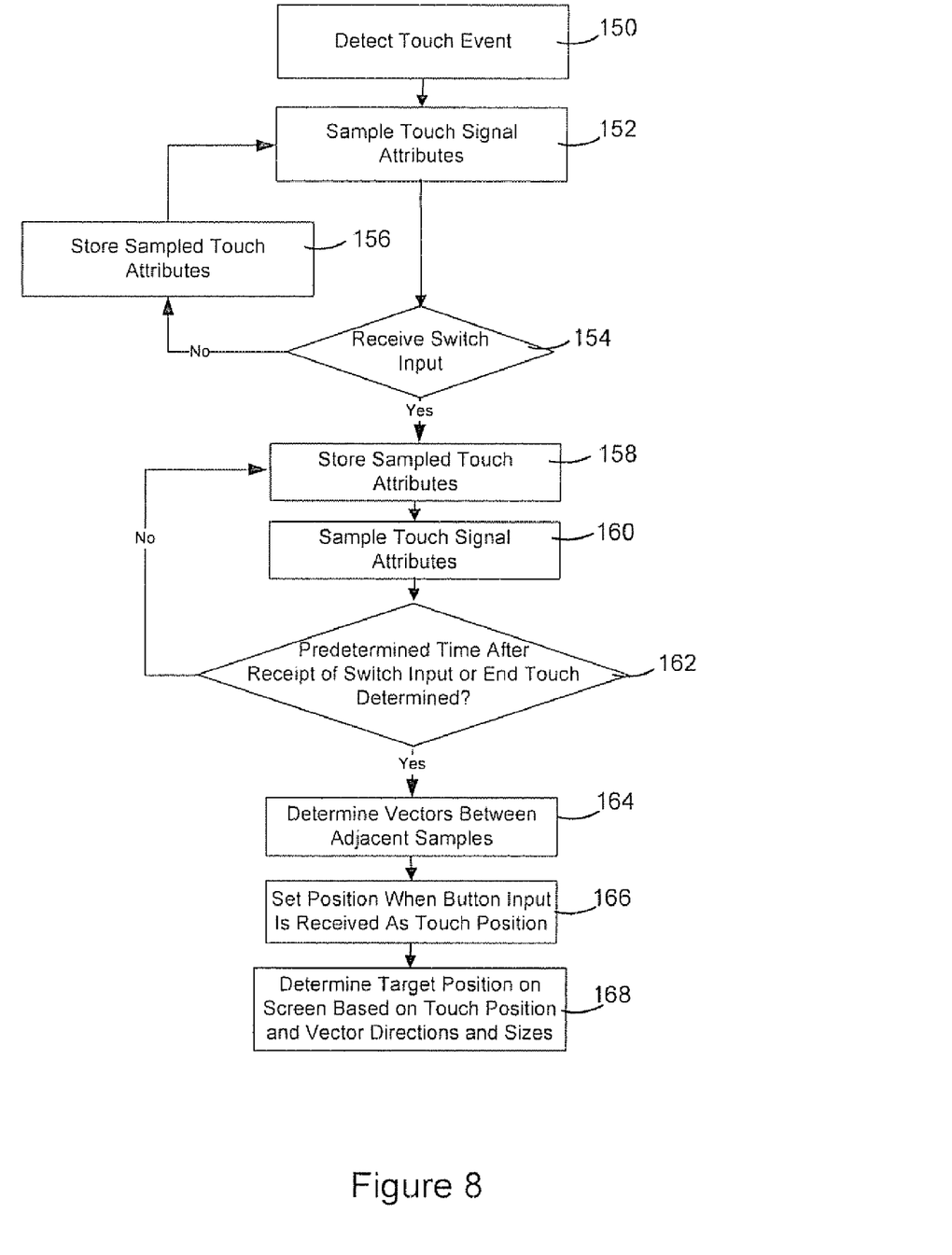
FIG. 8 is a flow chart illustrating steps in a method of determining input at a touch-sensitive input surface of a portable electronic device, according to another embodiment.

Reference is now made to FIGS. 7 and 8 to describe another portable electronic device and another embodiment of the method of determining input. FIG. 7 shows a simplified sectional view of an exemplary portable electronic device 20.

In the embodiment of the portable electronic device shown in FIG. 7, the touch-screen display 38 is supported by a rigid display support 82 to provide structural support to the touch-screen display 38 and inhibit bending causing damage or breaking of the touch-screen display 38. The display support 82 can be formed of any suitable material and can include further functional components such as a printed circuit board.

The touch-screen display 38 and the display support 82 are biased away from a base 84 of the housing 80, toward a frame 86, which frames the touch-sensitive overlay 38, by suitable biasing elements 88 such as foam posts or a single, continuous biasing element. Also located between the touch-screen display 38 and the base 84 of the housing 80 is a mechanical switch 90. In the present embodiment, the mechanical switch 90 is generally centered with respect to the display device 32 and located such that displacement of the display device 32, the touch-sensitive overlay 34 and the display support 82 resulting from a user pressing on the touch-sensitive overlay 34 actuates the mechanical switch 90. In the present embodiment, the mechanical switch 90 is located such that the mechanical switch 90 is in contact with the display support 82. Thus, depression of display device 32, the touch-sensitive overlay 34 and the display support 82 by user application of a force thereto, causes actuation of the mechanical switch 90, thereby providing the user with a positive tactile quality during user interaction with the user interface of the portable electronic device 20.

The functional components including the processor 22 and other components described above with reference to FIG. 3 are housed within the housing 80 to provide the functionality of the portable electronic device 20.

The mechanical switch 90 provides a further input device as actuation of the mechanical switch 90 by user application of a sufficient force to displace the display device 32, the touch-sensitive overlay 34 and the display support 82 generates a further signal input to the processor 22. The further signal from the actuation of the mechanical switch 90 can cause the initiation of commands at the processor 22, either alone or resulting from the combination of the signal from the mechanical switch and signals from the touch sensitive overlay 34.

Referring now to FIG. 8, signals are received at the controller 36 as a result of the beginning of a touch event in which a user's finger contacts the touch-sensitive overlay 34 of the touch-screen display 38 (step 150). The signals are analyzed at the controller 36 and resultant data transmitted to the processor 22. Thus, the X and Y location values when the touch event begins can be determined along with other attributes such as the size or the pressure of the touch at the touch-screen display 38. In response to determination of the beginning of the touch event at step 150, the touch signal is sampled by the controller 36 at a suitable regular interval and analyzed with the resultant data transmitted to the processor 22. Thus, the touch attributes for each sample are received at the processor 22 (step 152).

Again, the signal to the controller 22 changes, for example, when the user's finger shifts in any direction or when the user lifts the finger from the touch-sensitive overlay 34, therefore ending the touch event. It is determined if the mechanical switch 90 is actuated (step 154). If the mechanical switch has not been actuated, the process proceeds to step 156 and the touch attributes for the sample are stored in the memory at the portable electronic device 20. After storing the touch attributes, the process returns to step 152 and another sample is taken in the regular interval as described.

If, however, the mechanical switch is determined to have been actuated at step 154, the process proceeds to step 158 and the touch attributes for the sample are stored in the memory at the portable electronic device 20. After storing the touch attributes, the process continues to step 160 and another sample is taken in the same regular interval as in step 152. At step 162, it is determined if the touch event has ended as a result of the signal ending or if a predetermined time has passed after actuation of the switch 90. If not, then the process returns to step 158 and the touch attributes for the sample are again stored. It will now be appreciated that in steps 158 to 162, a number of samples are taken at the predefined interval until a predetermined time after actuation of the switch 90 occurs or until the touch event ends, whichever occurs first. Thus, a number of samples are taken after the actuation of the switch 90. The number of samples taken after actuation of the switch 90 is dependent on the frequency of sampling and the length of time during which samples are taken after actuation of the switch, which is defined by the predetermined time or by the ending of the touch event.

When either the predetermined time is reached or the touch event ends as determined at step 162, the process proceeds to step 164. The processor 22 analyzes the samples and determines vectors between stored samples, taken adjacent in time, to determine the direction and magnitude of shift in the location of the touch at the touch-screen display 38 (step 164). Again, the vectors determined at step 164 can be a single vector representing the shift in both the X and Y directions between adjacent samples or can be separate vectors, one representing the shift in the X direction and a second representing the shift in the Y direction between adjacent samples.

Thus, the X and Y values determined from the signal sampled at step 152 and stored at step 158 after determination of actuation of the switch 90 is then set as the detected touch point (step 166). Thus, the detected touch point is set as the touch location determined from the signal sampled at about the time of detecting actuation of the button at the touch-sensitive overlay 34. The target position on the touch-screen or targeted input is then determined based on the detected touch point from step 166 and based on the X and Y vector directions determined (or shift directions) and based on the size of the X and Y vectors (or the magnitude of the shift in the X and Y directions) (step 168). Since a user normally touches the touch-screen display 38 at a point that falls short of the intended target, the direction of shift when pressing and the reverse shift when lifting the finger again give information that permits the determination of the general direction of approach to the intended target. Thus, an approximation of the target position can be calculated based on the X and Y shift directions. From this approximation and based on the application, the input is determined.

In the present embodiment, a limited number of samples is therefore taken after actuation of the switch 90. It will be appreciated that the number of samples used before actuation of the switch 90 can also be limited. Thus, if the user moves his or her finger on the touch-screen display 38 without actuation of the switch 90, samples taken during the time period prior to actuation may not be used in the analysis at step 164, to reduce the use of erroneous data.

According to one aspect, there is provided a method of determining input at a touch-sensitive input surface of a portable electronic device includes detecting a touch event at the touch-sensitive input surface, sampling touch attributes during the touch event, determining an actual touch location and determining at least one shift in touch location based on the touch attributes sampled during the touch event, and determining an input based on the actual touch location and the direction of shift of the touch location.

According to another aspect, there is provided an electronic device that includes a housing, a display device exposed by the housing and a touch-sensitive input device overlying the display device. Functional components in the housing include a memory device and processor operably connected to the display device the touch-sensitive input device, and the memory device for executing a program stored in the memory device to cause the electronic device to detect a touch event at the touch-sensitive input surface, sample touch attributes during the touch event, determine an actual touch location and determine at least one shift in touch location based on the touch attributes sampled during the touch event, and determine an input based on the actual touch location and the direction of shift of the touch location.

According to yet another aspect, there is provided a computer-readable medium having computer-readable code embodied therein for execution by a processor for detecting a touch event at a touch-sensitive input surface, sampling touch attributes during the touch event, determining an actual touch location and determining at least one shift in touch location based on the touch attributes sampled during the touch event, and determining an input based on the actual touch location and the direction of shift of the touch location.

When a user touches a touch-screen device, the user commonly presses at a different location than intended. This is a result of the user aiming to press with the end of the finger while the part of the finger that contacts the touch-screen first is spaced from the end of the finger. This can result in incorrect input from the touch-screen device as the user touches the touch-screen at a point that is offset from the position at which the user intends or believes he or she is pressing, particularly when user-selectable options are closely spaced on the touch-screen. When contact with the screen is made, for example with a thumb during thumb-typing on a portable electronic device, the contact point generally shifts as the center of the touch location shifts during application of pressure and during release of pressure when lifting the finger from the touch-screen. It has been observed that the direction of shift (displacement) when pressing is generally opposite to the direction of shift during release of pressure. Further, the direction of shift during application of pressure (as the pressure increases) is dependent on the direction from which the point on the touch-screen being touched is approached. Thus, if the left thumb is used for contacting the touch-screen while holding the portable electronic device with the base of the thumb to the left the device, the approach is from the left towards the right. The shift during application of pressure (as pressure is increased) is therefore also in the direction from left to right. The shift during release of pressure as the finger is lifted, however is from right to left. By sampling the touch attributes while pressure is being applied and while pressure is being released, the direction of each of the two shifts can be determined along with the location of the touch at approximately the time when the direction of shift changes. Based on this information, an approximation of the intended target location on the touch-screen display can be made. In the above example of the left thumb, the approximate target location is determined to be to the right of the actual touch location. It will be appreciated that for touch contact using the right thumb, from the opposite direction, the directions of shift are also opposite and the approximate target location is determined to be to the left of the actual touch location.

Advantageously, an approximation of the target location can be determined based on the directions of shift of touch location and based on the actual touch location. Using this information, the portable electronic device can correct for the offset between the intended target and the actual touch location, thereby providing increased accuracy during selection of touch-screen options. For example, when typing using two thumbs on a virtual keyboard on the touch-screen display, the portable electronic device can correct for the offset for each thumb to increase typing accuracy. Increased accuracy reduces user interaction time with the device. Reduced interaction time reduces the time that the touch-screen device must be powered to provide output, thereby reducing power consumption and increasing battery life.

Embodiments of the present application may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations for implementation may also be stored on the machine-readable medium. Software running from the machine-readable medium may interface with circuitry to perform the described tasks.

While the embodiments described herein are directed to particular implementations of the electronic device and method of detecting user-selected input, it will be understood that modifications and variations to these embodiments are within the scope and sphere of the present application. For example, the order of some steps may vary and further steps are possible. It will also be appreciated that the Figures depict examples of the portable electronic device and other shapes and configurations are possible. The size and shape of many of the features can differ while still providing the same function. Many other modifications and variations may occur to those skilled in the art. All such modifications and variations are believed to be within the sphere and scope of the present application.

What is claimed is:

1. A method comprising:
    detecting a touch event on a touch screen display;
    sampling touch attributes during the touch event;
    determining a first touch location based on the touch attributes sampled at about a time of detecting actuation of a button by the touch screen display during the touch event and determining a first direction of shift of the touch event based on the touch attributes sampled prior to actuation of the button and a second direction of shift of the touch event based on the touch attributes sampled after actuation of the button; and
    determining an input by determining a second location different from the first touch location based on the first touch location, the first direction of shift, and the second direction of shift.

2. The method according to claim 1, wherein determining the second location is further based on a size of the shift of the touch event.

3. The method according to claim 1, wherein determining a first touch location comprises determining an approximate point of change from the first direction of shift to the second direction of shift.

4. The method according to claim 1, comprising confirming the first touch location based on the touch attributes sampled prior to actuation of the button.

5. The method according to claim 1, comprising confirming the first touch location based on at least one of an area of contact and a contact pressure at the determined first touch location.

6. The method according to claim 1, wherein sampling the touch attributes during the touch event comprises obtaining touch attributes at regular intervals between detecting the touch event and ending the touch event.

7. The method according to claim 6, wherein sampling the touch attributes during the touch event comprises receiving touch signals and determining X and Y locations of contact from the touch signals during the touch event.

8. The method according to claim 7, comprising storing the touch attributes after each sample is taken.

9. The method according to claim 1, wherein determining the first direction of shift comprises determining the first direction of shift based on a limited number of samples taken up to the actuation of the button.

10. The method according to claim 1, wherein determining the second direction of shift comprises determining the second direction of shift direction based on a limited number of samples taken after actuation of the button.

11. The method according to claim 1, further comprising confirming a change from the first direction of shift to the second direction of shift from a contact area of the touch event.

12. The method according to claim 1, wherein the second direction of shift of the touch event immediately follows the first direction of shift of the touch event.

13. An electronic device comprising:
a processor operably coupled to a touch screen display and configured to:
detect a touch event on the touch screen display,
sample touch attributes during the touch event,
determine a first touch location based on the touch attributes sampled at about a time of detecting actuation of a button by the touch screen display during the touch event and determine a first direction of shift of the touch event based on the touch attributes sampled prior to actuation of the button and a second direction of shift of the touch event based on the touch attributes sampled after actuation of the button, and
determine an input by determining a second touch location different than the first touch location based on the first touch location, the first direction of shift, and the second direction of shift.

14. The electronic device according to claim 13, wherein an approximate point of change from the first direction of shift to the second direction of shift is determined and the approximate point of change is identified as the first touch location.

15. The electronic device according to claim 13, wherein the first touch location is confirmed based on the touch attributes sampled prior to actuation of the button.

16. The electronic device according to claim 15, wherein the first touch location is confirmed based on at least one of an area of contact and a contact pressure at the determined first touch location.

17. The electronic device according to claim 13, wherein the touch attributes are sampled during the touch event by obtaining touch attributes at regular intervals between detecting the touch event and ending the touch event.

18. The electronic device according to claim 13, wherein the electronic device comprises an actuator.

19. The electronic device according to claim 13, wherein the first touch location is an approximate point of change from the first direction of shift to the second direction of shift.

20. The electronic device according to claim 13, further comprising confirming a change from the first direction of shift to the second direction of shift from a contact area of the touch event.

21. The electronic device according to claim 13, wherein the second direction of shift of the touch event immediately follows the first direction of shift of the touch event.

22. A computer-readable storage device having computer-readable code embodied therein executable by a processor for detecting a touch event on a touch screen display, sampling touch attributes during the touch event, determining a first touch location based on the touch attributes sampled at about a time of detecting actuation of a button by the touch screen display during the touch event and determining a first direction of shift of the touch event based on the touch attributes sampled prior to actuation of the button and a second direction of shift of the touch event based on the touch attributes sampled after actuation of the button, and determining an input by determining a second location different from the first touch location based on the first touch location, the first direction of shift, and the second direction of shift.

* * * * *